United States Patent [19]

Dodwell

[11] 4,167,593
[45] Sep. 11, 1979

[54] METHOD OF SUBBING A POLYESTER BASE

[75] Inventor: Geoffrey M. Dodwell, Hutton, England

[73] Assignee: Ciba-Geigy AG, Basel, Switzerland

[21] Appl. No.: 794,573

[22] Filed: May 6, 1977

[30] Foreign Application Priority Data

Jun. 4, 1976 [GB] United Kingdom ............... 23120/76
Sep. 28, 1976 [GB] United Kingdom ............... 40097/76

[51] Int. Cl.$^2$ .......................... G03C 1/78; G03C 1/96
[52] U.S. Cl. .................................. 427/171; 96/87 R; 427/385 B
[58] Field of Search ............. 96/87 R, 87 A; 427/171, 427/172, 173, 385 B

[56] References Cited

U.S. PATENT DOCUMENTS

| | | | |
|---|---|---|---|
| 3,545,972 | 12/1970 | D'Cruz | 96/87 R |
| 3,573,951 | 4/1971 | Abbott et al. | 96/87 R |
| 3,600,208 | 8/1971 | Abbott et al. | 96/87 R |
| 3,674,531 | 7/1972 | Shephard et al. | 96/87 R |
| 3,751,280 | 8/1973 | Nerurkar et al. | 96/87 R |
| 3,939,130 | 2/1976 | Ponticello | 96/87 R |
| 4,011,201 | 3/1977 | Ponticello | 96/87 R |
| 4,019,908 | 4/1977 | Wright | 96/87 R |
| 4,052,528 | 10/1977 | Cook et al. | 96/87 R |

FOREIGN PATENT DOCUMENTS 732607 6/1955 United Kingdom .
1177426 1/1970 United Kingdom .

Primary Examiner—Jack P. Brammer
Attorney, Agent, or Firm—Sprung, Felfe, Horn, Lynch & Kramer

[57] ABSTRACT

A method of preparing film base material consisting of biaxially oriented synthetic linear polyester of highly hydrophobic character is provided which comprises coating as a layer on to a layer-receptive film of linear polyester a solution of or an aqueous latex of
(a) a copolymer of the type used to prepare a subbing layer for hydrophobic film base material and
(b) 1.5 to 25% by weight of the copolymer present of a compound which contains an active methylene group, and then drying the coated layer and completing the orientation if it has not been fully oriented.

The film base material is useful for preparing photographic material by coating directly on the copolymer subbing layer a gelatino silver halide emulsion layer. The gelatino silver halide emulsion layer adheres very strongly to the subbing layer. Further the separation of the layers or frilling is prevented when processing the photographic material.

10 Claims, No Drawings

METHOD OF SUBBING A POLYESTER BASE

This invention relates to synthetic film materials, and more particularly to film base materials of use in the production of photographic materials.

It is known that self-supporting films formed of synthetic linear polyesters, particularly of the polyesters formed by reaction of ethylene glycol and terephthalic acid, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so called "subbing" layers) between the film base and the emulsion layer, but the materials hitherto suggested for this purpose in connection with other film bases have not always proved entirely satisfactory when applied to film base of biaxially oriented synthetic linear polyesters of highly hydrophobic character.

Therefore according to the present invention there is provided a method of preparing film base material consisting of biaxially oriented synthetic linear polyester of highly hydrophobic character which comprises coating as a layer on to a layer-receptive film of linear polyester a solution of or an aqueous latex of (a) a copolymer of the type used to prepare a subbing layer for hydrophobic film base material and
(b) 1.5 to 25% by weight of the copolymer present of a compound which comprises an active methylene group, and then drying the coated layer and completing the orientation if it has not been fully oriented.

Preferably the amount of compound (b) is 7.5 to 17.5% by weight.

By "layer receptive film of linear polyester" is meant either a film of linear polyester which is in a state in which it is receptive to a coating of an aqueous latex or solution of a copolymer or which has been pretreated to render it receptive to a coating of an aqueous latex or solution of a copolymer.

A polyester film which has been biaxially oriented is high hydrophobic but a film of polyester which has not been oriented at all or which has been oriented in one direction only is receptive to a subbing coat. If such a subbing coating applied to a polyester film which has been oriented in one direction only is dried, the polyester film can then be oriented in the second direction and the applied coating, as long as it comprises polymeric material which is above its second order transition temperature during the stretching, will remain firmly anchored on the polyester film. This coating will then form a layer on to which more hydrophilic coatings can be applied. It is possible to coat polyester film which has not been oriented at all with a hydrophilic layer and then to stretch it in two directions with the coating on it but this is not advantageous as the coating requires to be thicker which can lead to a poorer coating quality.

Alternatively polyester film material and in particular biaxially oriented polyester film material may be treated so as to render its surface receptive to an applied coating.

Preferably the treatment of the surface of the film of synthetic linear polyester which enables a polymer layer to adhere thereto is to coat on to the surface of the polyester film an organic solvent solution or aqueous solution of a phenolic adhesion promoting agent and then to remove the solvent, preferably by evaporation.

Synthetic organic solvents in which to dissolve the phenolic adhesion promoting agents are methanol, ethanol, methyl ethyl ketone, acetone, dioxan and mixtures thereof.

By "phenolic adhesion promoting agent" is meant a phenol-based or naphthol-based compound which is capable of acting on the polyester film base so as to render its surface more receptive to an applied layer. Examples of such compounds are m-cresol, o-cresol, resorcinol, orcinol, catechol, pyrogallol, 1-naphthol each of which compounds may be substituted with one or more chloro-, fluoro- or nitro substituents and phenol substituted with one or more chloro-, fluoro- or nitro-substituents. The action of the adhesion promoting agent on the polyester film base is thought to be swelling action and polyester surfaces so treated are receptive to certain polymeric subbing layers but not to hydrophilic layers for example a gelatin or polyvinyl alcohol.

Alternatively the film of polyester may be treated by a physical method, for example corona discharge treatment, which renders the surface capable of accepting a polymer layer as described in British patent specification Nos. 1,262,127, 1,267,215 and 1,286,457.

However the particular advantage of the method of the present invention is that the latex or solution containing the copolymer and active methylene group containing compound can be coated onto a film of linear polyester which has been oriented in one direction only. This coating is then dried to form an adherent layer and the orientation in the second direction can then be effected to produce biaxially oriented polyester film base. A hydrophilic layer for example a silver halide emulsion can then be coated on to the coated side of the film base and this emulsion layer will remain firmly adherent to the film base, without the need for an intermediate gelatin layer, thus reducing the number of coating operations required.

With regard to the copolymers used to prepare a subbing layer for hydrophobic film base a great many have been proposed and several have been used in practice. Most commonly such copolymers are based on vinylidene chloride together with at least one plasticising comonomer, i.e. a comonomer which renders vinylidene chloride, less crystalline thus improving its film forming properties.

Examples of particularly suitable plasticising comonomers are acrylonitrile, alkyl acrylate and alkyl methacrylate.

According to a preferred form of the present invention there is provided a method of preparing film base material consisting of biaxially oriented synthetic linear polyester of highly hydrophobic character which comprises coating as a layer on to a layer-receptive film of linear polyester a solution of or an aqueous latex of a copolymer which has been prepared by copolymerising (a) vinylidene chloride, at least one plasticising comonomer selected from acrylonitrile, alkyl acrylate and alkyl methacrylate, and optionally other comonomers, and (b) 1.5 to 25% by weight of the copolymer present of a compound which comprises an active methylene group, and then drying the coated layer and completing the orientation if it has not been fully oriented.

With regard to this copolymer when used to form a subbing layer the presence of the vinylidene chloride causes the copolymer to adhere well to polyester, however the presence of a plasticising comonomer is required to decrease the tendency of the vinylidene chloride to form a crystalline layer. The preferred plasticising comonomers are lower alkyl (i.e. 1–6 carbon atoms) acrylate and methacrylate esters for example methyl methacrylate and methyl acrylate.

Other comonomers, units of which may be present in the copolymer are acids, for example acrylic acid, methacrylic acid, itaconic acid, maleic acid, fumaric acid, crotonic acid, mesaconic acid and citraconic acid. Yet other comonomers, units of which may be present in the copolymer are comonomers which comprise an active halogen group.

Particularly suitable comonomers having an active halogen group are allyl, methallyl or vinyl compounds of the general formula

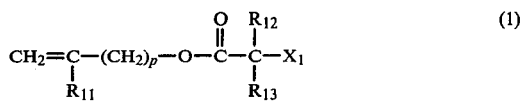

wherein p is 0 or 1, $R_{11}$ is hydrogen or methyl when p is 1 but is hydrogen when p is 0, $X_1$ is bromine or chlorine and $R_{12}$ and $R_{13}$ are each hydrogen or methyl or are the same halogen atom as $X_1$, or a vinyl component containing an active halogen group the monomer of which has the general formula

wherein $X_2$ is chlorine or bromine.

Formula (1) covers two classes of monomers: allyl or methallyl halogeno esters of the general formula

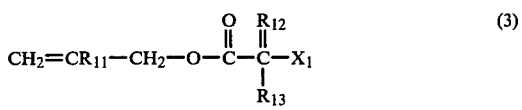

and vinyl halogeno esters of the general formula

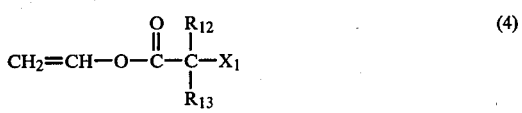

wherein in the above formulae (3) and (4) $R_{11}$, $R_{12}$, $R_{13}$ and $X_1$ have the meanings given to them above.

The allyl or methallyl halogeno esters of formula (1) may be prepared by reacting allyl or methallyl alcohol with the appropriate halocarboxylic acid.

The vinyl halogeno esters of general formula (1) may be prepared by reacting acetylene with the appropriate halocarboxylic acid in the presence of a catalyst, for example mercuric oxide or by the transvinylation reaction between vinyl acetate and the appropriate halocarboxylic acid.

The halomethyl vinyl ketones of formula (2) may be prepared by the method of Cath et al, J. Chem. Soc. 1948, page 278.

Preferably the copolymer comprises from 20 to 95% by weight of vinylidene chloride and at least 5% by weight of the plasticising comonomer. Suitable copolymers comprise from 20 to 95% by weight of vinylidene chloride, from 5 to 50% by weight of plasticising comonomer, 0 to 20% by weight of copolymerisable acid and 0 to 25% by weight of other comonomers.

Especially suitable copolymers comprise from 60 to 85% by weight of vinylidene chloride, from 7 to 20% by weight of lower alkyl acrylate or methacrylate, from 0 to 3% by weight of itaconic acid and from 0 to 20% by weight of a comonomer having an active halogen group.

Examples of suitable copolymers contain vinylidene chloride (81% by weight), methyl acrylate (7.7%), allyl monochloroacetate (9.4%) and itaconic acid (1.9%) vinylidene chloride (90%), methyl acrylate (8.0%) and itaconic acid (2.0%); vinylidene chloride (54.7%), methyl acrylate (21.6%), allyl aceto acetate (9.3%) and acrylic acid (14.4%). The preparation of these copolymers is set forth hereinafter.

Other suitable copolymers are copolymers of vinylidene chloride with vinyl chloride and optionally other comonomers. Examples of others comonomers which may be present are the monomer acids as hereinbefore set forth and monomers having an active halogen group as hereinbefore set forth. Examples of particularly suitable copolymers based on vinylidene chloride/vinyl chloride are those which contain vinylidene chloride (50% by weight) and vinyl chloride (50% by weight).

Other suitable copolymers are those based on vinyl halogeno-esters of formula (4) as hereinbefore set forth and particularly vinyl monochloroacetate as described in British patent specification Nos. 1,088,906, 1,143,843, 1,141,395 and 1,208,821. Particular copolymers of this type are those described in No. 1,208,821 which comprise a vinyl halogeno ester and at least one other monomer copolymerisable therewith, the said monomer or at least one of the said monomers being selected so that the final copolymer has a softening point lower than that of the product obtained by polymerisation in the absence of the said selected monomer or monomers. A particularly suitable vinylmonochlorester is vinylmonochloracetate. Examples of comonomers having a softening point effect are alkyl acrylates, alkyl methacrylates, polyalkylene oxide itaconates and maleates, vinyl alkyl esters, vinyl esters, alkenes, alkadienes and alkyl styrenes. Especially suitale monomers are ethyl acrylate, 2-ethylhexyl acrylate, vinyl isobutyl ether and ethylene.

Examples of other comonomers which may be present are allyl alcohol, vinyl alcohol, vinyl acetate, acrylonitrile and acrylamide.

Preferably such copolymers comprise from 70–95% by weight of the vinyl halogeno ester, from 3–20% by weight of the softening comonomers and from 0–10% by weight of another monomer.

The copolymers can be prepared and coated as an organic solvent solution or, preferably, as an aqueous latex.

When the copolymer is made as a latex, the compound which contains an active methylene group to be at least slightly water soluble to the extent of at least 2 g/liter. By compound which comprises an active methylene group is meant a compound which has a methylene group having at least one free hydrogen atom attached thereto and having either a methyl or ethyl substitute group or another free hydrogen atom attached thereto and which compound is substituted by two electron withdrawing groups so located in relation to the methylene group that the hydrogen atom or atoms of the methylene group has an appreciable acidic character, i.e. the $pK_a$ values are not greater than about 16 and preferably not greater than 12. The usual activating groups are either a —CN group or a $$-\underset{\underset{O}{\|}}{C}-$$

group.

Suitable compounds having an active methylene group are compounds of the general formula $$R-CO-CH_2-CN \qquad (5)$$

or formula $$R-CO-CH_2-CO-R^1 \qquad (6)$$

or formula $$R-CO-CH_2-CH_2-CO-R^1 \qquad (7)$$

or formula $$R-CO-\underset{\underset{CH_3}{|}}{CH}-CO-R^1 \qquad (8)$$

wherein in the above four formulae R and $R^1$ are each alkyl, hydroxy alkyl, alkenyl of up to 5 carbon atoms, aryl such as phenyl, hydroxy or hydrogen.

Other suitable compounds containing active methylene groups are the vinyl ketone compounds of formula $$CH_2=CH-\overset{\overset{O}{\|}}{C}-CH_2-Q \qquad (9)$$

wherein Q is CN or $$\overset{\overset{O}{\|}}{O-C-CH_3},$$

or vinyl acetates of the general formula $$CH_2=CH-O-\overset{\overset{O}{\|}}{C}-CH_2-Z \qquad (10)$$

wherein Z is —CN, —COCH$_3$ or —CO—C$_6$H$_5$ where the phenyl group may be further substituted by for example halogen, nitro, lower alkyl, or lower alkoxy groups of 1 to 5 carbon atoms.

The acetoxymethyl vinyl ketone may be prepared from chloromethyl vinyl ketone (prepared by the method of Cath et al, J. Chem. Soc. 1948, page 278) by the method described by A. Arbuzow and A. M. Korolev. Zhurnal Obshchei Khimii. Vol. 32, No. 11, pp 3674-3676. November 1967.

The cyanomethyl vinyl ketone may be prepared by the reaction of potassium cyanide and chloromethyl vinyl ketone.

The vinyl cyanoacetate and benzoyl and ring substituted benzoyl acetate may be prepared by the transvinylation reaction as described in U.S. Pat. No. 3,093,161.

The vinyl acetoacetate may be prepared by the pyrolysis of ethylene glycol esters as described in German Offenlegungsschrift No. 2,142,419.

Examples of suitable allyl or methallyl monomers having an active methylene group which are of use in the present invention are compounds of the general formula $$CH_2=\underset{\underset{R_{14}}{|}}{C}-CH_2-X-\underset{\underset{O}{\|}}{C}-CH_2-W \qquad (11)$$

wherein W is —CN or —COCH$_3$, X is O, NH or S, and $R_{14}$ is hydrogen or methyl.

The allyl or methallyl cyano acetate of formula (11) may be prepared by reacting allyl or methallyl alcohol with cyanoacetic acid.

The allyl or methallyl cyanoacetamides may be prepared as described in U.S. Pat. No. 2,808,331.

Allyl or methallyl acetoacetates may be prepared by the noncatalytic ester exchange reaction of beta-keto carboxylic acid esters as described in U.S. Pat. No. 2,693,484.

The allyl or methallyl acetoacetamides may be prepared by the reaction of diketene with allyl or methallyl amine.

The alkyl or methallyl acetothioacetates may be prepared by reacting allyl or methallyl mercaptan with diketene.

The allyl or methallyl cyano thioacetates may be prepared by the reaction of allyl or methallyl mercaptan with cyanoacetyl chloride.

Other suitable compounds not of formula (9) or (10) are β-diketones such as 2,4-pentanedione, β-keto esters such as alkyl aceto acetates, β-dicarboxylic acid derivatives such as dialkyl malonates, malonic acid and malonitrile and cyano esters such as alkyl cyanoacetates. Yet other suitable compounds containing active methylene groups are levulinic acid which is of formula (7) and 3-methyl-2,4-pentanedione which is of formula (8).

The preferred compounds are allylacetoacetate, malonic acid, cyanoacetic acid and 2,4-pentanedione.

In the method of the present invention the latex of the copolymer or the solution of the copolymer is prepared and the compound containing the active methylene group may be added to the latex or solution as a fine solid or liquid depending on its normal state. If the copolymer is present as a latex the compound containing the active methylene group may be added as an aqueous solution. If the copolymer is present as an organic solvent solution the compound containing the active methylene group may be added as an organic solvent solution.

The film base material prepared by the process by the process of the present invention is able to accept a hydrophilic layer adherent thereto, for example a gelatin based layer, a polyvinyl alcohol layer or polyvinyl acetal layer.

The gelatin based layer may be a gelatino silver halide emulsion layer but sometimes when the process of the present invention is employed to prepare film base material for use in the production of photographic gelatino silver halide material an intermediate gelatin layer is provided between the copolymer layer as hereinbefore defined and the silver halide emulsion layer.

However as stated and illustrated in the following Examples it is possible to coat directly on to the copolymer layer a gelatino silver halide emulsion layer. The gelatino silver halide emulsion layer adheres very strongly to the copolymer subbing layer on the film base and neither the gelatin layer nor the subbing layer fall away from the polyester film during either prolonged aqueous processing or water washing.

The particular advantages of eliminating gelatin subbing layers are the reduction in the number of operations thus minimising potential defects, as well as, in the case of interdraw coating, the possibility of all of the coatings being carried out in one continuous operation on one machine.

Therefore according to a preferred aspect of the present invention there is provided a process for the preparation of silver halide photographic material which comprises preparing a uniaxially oriented film of polyester, coating as a layer on this film an aqueous latex of
 (a) a copolymer of the type used to prepare a subbing layer for hydrophobic film base and
 (b) 1.5 to 25% by weight of the copolymer present a compound which comprises an active methylene group then drying the coated layer and completing the orientation and then coating on to the dried layer a gelatino silver halide layer and drying the silver halide emulsion layer.

When the hydrophilic layer to be applied to the film base material as prepared by the process of the present invention is polyvinyl alcohol or polyvinyl acetal such a hydrophilic layer may comprise a light-sensitive diazonium salt to produce a diazotype material.

Alternatively after a polyvinyl alcohol or polyvinyl acetal layer has been coated on to the film base material as prepared by the process of the present invention the polyvinyl alcohol or polyvinyl acetal may have incorporated therein or be coated with a light-sensitive diazonium salt to produce a diazotype material.

It is to be understood that the process of the present invention covers not only the process of preparing subbed biaxially orientated linear polyester film base but the polyester film base when so prepared as well as photographic material having coated on the film base at least one light-sensitive layer.

PREPARATION 1

Vinylidene chloride (60.6 g) was mixed together with 23.9 g of methyl acrylate, 15.9 g of acrylic acid and 10.3 g of allyl cyanoacetate in 100 ml of methyl ethyl ketone to give 50% by volume solution, the temperature of the methyl ethyl ketone being below 25° C. Then as copolymerisation initiator 1.0 g of 2,2'-azobisisobutyronitrile was added to the monomer solution. The solution was maintained at 40° C. until the copolymerisation was complete, which took 6 days.

Infra-red spectra and titrimetric analysis showed that substantially all the monomers had been incorporated into the copolymer which thus contained about 54.7% by weight vinylidene chloride, 21.6 wt % methyl acrylate, 14.4 wt % acrylic acid and 9.3 wt % allyl cyanoacetate. This copolymer was used in the examples which follow and is referred to therein as copolymer 1.

PREPARATION 2

A second copolymer was prepared similarly using vinylidene chloride 60.6 g (50 ml), methyl acrylate 23.9 g (25 ml), acrylic acid 15.9 g (15 ml) and allyl acetoacetamide 10.4 g (10 ml). The resulting copolymer contained vinylidene chloride 54.7 weight %, methyl acrylate 21.6 wt %, acrylic acid 14.4 wt %, allyl acetoacetamide 9.3 wt %.

This copolymer was also used in the Example 1 and is referred to therein as copolymer 2.

PREPARATION 3

A third copolymer was prepared similarly using vinylidene chloride 60.6 g (50 ml), methyl acrylate 23.9 g (25 ml), acrylic acid 15.9 g (15 ml) and allyl acetoacetate 10.3 g (10 ml). The resulting copolymer contained vinylidene chloride 54.7 weight %, methyl acrylate 21.6%, acrylic acid 14.4% and allyl acetoacetate 9.3%.

This copolymer was also used in the examples and is referred to therein as copolymer 3.

PREPARATION 4

To 240 ml of de-oxygenated water was added vinylidene chloride (80 ml), methyl acrylate (10 ml) allyl monochloroacetate (10 ml), itaconic acid (2.25 g), sodium metabisulphite (1 g), sodium persulphate (1 g), alkyl aryl poly glycidol condensate (0.2 g), sodium alkyl aryl poly(oxyethylene) sulphate (0.9 g) and the mixture stirred at 25° C. during polymerisation under nitrogen.

This latex was used in the examples and is referred to therein as latex 1. It comprises 81% by weight of vinylidene chloride, 7.7% by weight of methyl acrylate, 9.4% by weight of allyl monochloracetate and 1.9% by weight of itaconic acid.

PREPARATION 5

A latex was prepared as in Preparation 4 but the quantities of monomers added were as follows:
 vinylidene chloride: 80 ml
 methyl acrylate: 10 ml
 itaconic acid: 2.25 g The resulting latex comprised vinylidene chloride 90% by weight, methyl acrylate 8.9% itaconic acid 2.0%.

The latex of this preparation is designated latex 2.

PREPARATION 6

A latex was prepared as in preparation 5 but the quantities of monomers added were as follows:
 vinylidene chloride: 80 ml
 methyl acrylate: 10 ml
 allyl aceto acetate: 10 ml The resulting latex comprised vinylidene chloride 82.5% by weight, methyl acrylate 7.9% and allyl aceto acetate 9.6%.

The latex of the preparation is designated latex 3.

EXAMPLE 1

The following coatings were applied sequentially to biaxially oriented film based on the synthetic linear polyester obtained from ethylene glycol and terephthalic acid which is highly hydrophobic.

First Coating solution of p-Chloro-m-cresol: 2 g
Methanol: 100 ml
dried 2 minutes at 70° C.

Second Coating solution of Copolymer 1.
to which is added 10% by weight of cyanoacetic acid in methyl ethyl ketone: 100 ml,
dried at 100° C. for 5 minutes.

A number of similar subbed film bases were prepared using in the second coating the following:

Example 2 used copolymer 1 solution+10% by weight of methyl aceto acetate.

Example 3 used copolymer 1 solution+7½% by weight of allyl aceto acetate.

Example 4 used copolymer 1 solution+12½% diethyl malonate

Example 5 used copolymer 1 solution+12½% malonic acid

Example 6 used copolymer 2 solution+15% ethyl aceto acetate

Example 7 used copolymer 3 solution+12½% 2,4-pentane dione

Example 8 used copolymer 3 solution+10% acetoxymethyl vinyl ketone

Example 9 used copolymer 1 alone  } comparison examples.
Example 10 used copolymer 3 alone A similar set of coatings was prepared using the aqueous latexes instead of the organic solvent solutions in the second coating.

Example 11 used latex 1 with 10% by wt. of methyl aceto acetate

Example 12 used latex 1 with 10% by wt. of allyl aceto acetate

Example 13 used latex 1 with 15% by wt. of diethyl malonate

Example 14 used latex 2 with 17½% by wt. of ethyl aceto acetate

Example 15 used latex 3 with 15% malonic acid

Example 16 used latex 3 with 15% sodium cyanoacetate

Example 17 used latex 2 alone  } comparison example
Example 18 used latex 3 alone A third set of coatings was prepared by interdraw coating the latexes and active methylene compounds as used above.

The latex and active methylene compound was coated onto uniaxially oriented polyester prepared by extrusion onto a chilled drum, heating to between 80° and 100° C. and stretching over capstan rollers of increasing circumferential speed to a draw ratio of about 3.

The copolymer layer was dried at about 90° C. and the polyester was stretched laterally in a stenter apparatus at between 80° and 100° C. to a ratio of about 3.

The biaxially oriented polyester was heat set at 210° C. while the tension was maintained for 1-4 minutes.

Example 19 used latex 1 with 10% by wt. of methyl aceto acetate

Example 20 used latex 1 with 10% by wt. of allyl aceto acetate

Example 21 used latex 1 with 15% by wt. of diethyl malonate

Example 22 used latex 2 with 17½% by wt. of ethyl aceto acetate

Example 23 used latex 3 with 15% malonic acid

Example 24 used latex 3 with 15% sodium cyanoacetate

Example 25 used latex 2 alone  } comparison example
Example 26 used latex 3 alone The bases so prepared in the preceeding examples were directly coated with a gelatino silver halide emulsion and were tested for adhesion in the usual manner.

Two types of adhesion are important the first is dry adhesion. This adhesion relates to the copolymer on the base and to the hydrophilic layer coated on the copolymer layer, the object of subbing being of course to enable the hydrophilic layer to remain firmly adherent on to the hydrophobic film base. The hydrophilic layer may be an anti-halation backing layer or a photosensitive layer e.g. a silver halide emulsion layer. It is important that other layers remain firmly anchored to the base when the film material is finished, i.e. cut up into small strips and enclosed in cassettes or spooled up. Further it is important that the hydrophilic layers do not frill off when the film is placed in the camera or when removed from the camera.

There are no recognised standard dry adhesion tests. However the following two tests were carried out on strips of the sets of samples as prepared above each of which had been coated with a silver halide emulsion layer.

| Tear test. (strip torn) | | | | | |
|---|---|---|---|---|---|
| Effect Observed. | No fringe. | Small stripped fringe. | Large stripped fringe. | Large areas peeled away. | Whole coating peels off. |
| Arbitrary Grade. | 1 | 2 | 3 | 4 | 5 |
| Taped test. (razor cuts made on surface of strips, tape applied and torn away.) | | | | | |
| Effect Observed | No coating removed. | Small amount removed. | More removed. | Large areas removed. | Whole coating removed. |
| Arbitrary Grade | 1 | 2 | 3 | 4 | 5 |

Strips of the samples prepared above were subjected to these two dry tests, the results of which are shown in Table 1. The figures shown correspond to the Arbitrary Grade listed above.

Table 1.

Dry adhesion grading.

| Sample | Tear | Tape |
|---|---|---|
| a) solvent coatings | | |
| 1 | 1 | 1 |
| 2 | 2 | 2 |
| 3 | 1 | 1 |
| 4 | 2 | 2 |
| 5 | 1 | 1 |
| 6 | 1 | 2 |
| 7 | 1 | 1 |
| 8 | 1 | 1 |
| 9 | 2 | 3 |
| 10 | 2 | 3 |
| b) latex coatings | | |
| 11 | 2 | 2 |
| 12 | 1 | 1 |
| 13 | 3 | 3 |
| 14 | 2 | 2 |
| 15 | 1 | 1 |
| 16 | 1 | 1 |
| 17 | 4 | 4 |
| 18 | 4 | 4 |
| c) interdraw latex coatings | | |
| 19 | 2 | 2 |
| 20 | 1 | 1 |
| 21 | 2 | 3 |
| 22 | 1 | 1 |
| 23 | 1 | 2 |
| 24 | 1 | 1 |
| 25 | 2 | 3 |
| 26 | 2 | 2 |

Wet Adhesion

The film base of the present invention is of particular use as photographic film base in which case at least one photographic silver halide emulsion layer is coated on the subbed film base.

Such photographic film material is usually processed in a sequence of aqueous processing baths and it is very important that all the final image layer is retained firmly on to the base.

A typical processing sequence comprises immersion in the listed aqueous baths in the period stated, alkaline developer bath 3 minutes, acid stop-bath 1 minute, acid fix bath 10 minutes, aqueous washing in circulating water 20 minutes, followed by hot air drying.

However some modern processes particularly when forced development is required employ immersion in stronger alkaline solutions for longer periods. Thus a separate alkaline test was also included. This consisted in immersing the samples in 1% sodium hydroxide solution for 10 minutes followed by a normal washing. The samples were subjected to a scratch/rub test after wet processing this consisted of making a scratch mark in the coating on the film while still wet and then rubbing the film surface perpendicular to the scratch.

| Wet tests. | | | | |
|---|---|---|---|---|
| Effect observed. | No peeling of emulsion. | Some peeling. | Areas of emulsion litft. | All emulsion lifts away. |
| Arbitrary Grade. | 1 | 2 | 3 | 4 |

Strips of the samples prepared above were subjected to these wet tests and the results are shown in Table 2.

The figures shown correspond to the Arbitrary Grades listed above.

Table 2.

Wet adhesion grading.

| Sample | dev | fix | wash | 1% alkali |
|---|---|---|---|---|
| a) solvent coatings. | | | | |
| 1 | 1 | 1 | 1 | 1 |
| 2 | 1 | 1 | 1 | 1 |
| 3 | 1 | 1 | 1 | 1 |
| 4 | 2 | 2 | 1 | 2 |
| 5 | 1 | 1 | 1 | 1 |
| 6 | 1 | 1 | 1 | 1 |
| 7 | 1 | 1 | 1 | 1 |
| 8 | 1 | 1 | 1 | 1 |
| 9 | 3 | 3 | 3 | 3 |
| 10 | 3 | 2 | 2 | 3 |
| b) latex coatings. | | | | |
| 11 | 1 | 1 | 1 | 1 |
| 12 | 1 | 1 | 1 | 1 |
| 13 | 1 | 1 | 1 | 2 |
| 14 | 1 | 1 | 1 | 1 |
| 15 | 1 | 1 | 1 | 1 |
| 16 | 1 | 1 | 1 | 1 |
| 17 | 2 | 2 | 2 | 2 |
| 18 | 2 | 3 | 2 | 2 |
| c) interdraw latex coatings. | | | | |
| 19 | 2 | 2 | 2 | 2 |
| 20 | 1 | 1 | 1 | 1 |
| 21 | 2 | 2 | 2 | 2 |
| 22 | 1 | 1 | 1 | 1 |
| 23 | 1 | 1 | 1 | 1 |
| 24 | 1 | 1 | 1 | 1 |
| 25 | 4 | 4 | 4 | 4 |
| 26 | 4 | 4 | 4 | 4 |

These results show that the layers in film material made using the film base according to the present invention exhibits very good adhesion but the layers in film material made using the film base not according to the present invention, that is to say when the subbing assembly used did not comprise any compounds of formulae (5) to (11) (samples 9, 10, 17, 18, 25 and 26), did not exhibit adequate adhesion.

What we claim is:

1. A method of preparing a subbed film base support material consisting of biaxially oriented synthetic linear polyester of highly hydrophobic character which comprises coating on to the linear polyester base which is receptive to a coating, an aqueous latex or an organic solvent solution of a coating composition consisting essentially of
    (a) a copolymer of (1) vinylidene chloride, (2) at least one plasticising comonomer selected from the group consisting of acrylonitrile, alkyl acrylates or methacrylates and (3) optionally other comonomers and
    (b) in an amount of 1.5 to 25% by weight of the copolymer (a)
    a compound containing an active methylene group of the formulae $RCOCH_2CN$, $RCOCH_2COR^1$, $RCOCH_2CH_2COR^1$ or

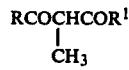

wherein R and $R^1$ are each hydrogen, hydroxy or alkyl, hydroxyalkyl or alkenyl of up to 5 carbon atoms or of the formula

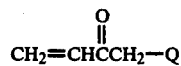

wherein Q is —CN or

or of the formula

wherein Z is —CN, —$COCH_3$ or —$COC_6H_5$ where the phenyl group is optionally substituted by halogen, nitro or alkyl or alkoxy of 1 to 5 carbon atoms, or of the formula

wherein W is —CN or —$COCH_3$, X is O, NH or S and $R_{14}$ is hydrogen or methyl, drying the coated layer and then completing the orientation if it has not been fully oriented.

2. A method according to claim 1 wherein the aqueous latex or solution comprises from 7.5 to 17.5% by weight of the compound which comprises an active methylene group.

3. A method according to claim 1 wherein the other comonomers are selected from acrylic acid, methacrylic acid, itaconic acid, maleic acid, fumaric acid, crotinic acid, mesaconic acid and citraconic acid.

4. A method according to claim 1 wherein the copolymer also comprises a comonomer which has an active halogen group.

5. A method according to claim 1 wherein the copolymer comprises 20 to 95% by weight of vinylidene chloride and at least 5% by weight of the plasticising comonomer.

6. A method according to claim 5 wherein the copolymer comprises from 20 to 95% by weight of vinylidene chloride, from 5 to 50% by weight of plasticising comonomer, 0 to 20% by weight of copolymerisable acid and 0 to 25% by weight of other comonomers.

7. A method according to claim 6 wherein the copolymer comprises from 60 to 85% by weight of vinylidene chloride, from 7 to 20% by weight of lower alkyl acrylate or methacrylate, from 0 to 3% by weight of itaconic acid and from 0 to 20% by weight of a comonomer having an active halogen group.

8. A method according to claim 1 wherein the compound which comprises an active methylene group is alkylacetoacetate, malonic acid, cyanoacetic acid or 2,4-pentanedione.

9. Film base material prepared according to the method of claim 1.

10. A method according to claim 8 wherein the compound which comprises an active methyhlene group is methylacetoacetate.

* * * * *